United States Patent

[11] 3,579,161

| [72] | Inventors | Sigmunt J. Kremzner<br>Pompton Plains;<br>William Pasechnick, Little Ferry, N.J. |
|---|---|---|
| [21] | Appl. No. | 867,148 |
| [22] | Filed | Oct. 17, 1969 |
| [45] | Patented | May 18, 1971 |
| [73] | Assignee | Singer-General Precision, Inc.<br>Little Falls, N.J. |

[54] ELECTROMAGNETIC DEVICE
2 Claims, 3 Drawing Figs.

[52] U.S. Cl. .................................................. 335/272,
310/155, 310/156
[51] Int. Cl. .................................................. H01f 7/08
[50] Field of Search .................................... 335/236,
272; 310/156, 261, 190, 49, 172, 269, 155

[56] References Cited
UNITED STATES PATENTS

| 3,235,761 | 2/1966 | Nohen .................... | 310/172 |
| 3,482,126 | 12/1969 | Bradley ................... | 310/269 |

*Primary Examiner*—Harold Broome
*Assistant Examiner*—F. E. Bell
*Attorneys*—S. A. Giarratana and S. Michael Bender

ABSTRACT: An electromagnetic device in which a rotor rotates within a stator in response to a plurality of electromagnets formed on the stator being selectively magnetized to cause attraction and repulsion with a north pole portion and a south pole portion of the rotor. Two or more spaced permeable bars are carried by the rotor, and are adapted to provide a variable reluctance path for magnetic flux passing between the rotor and the stator.

SIGMUNT J. KREMZNER
WILLIAM PASECHNICK
INVENTORS

BY

ELECTROMAGNETIC DEVICE

BACKGROUND OF THE INVENTION

This invention relates to an electromagnetic device, and, more particularly, to such a device in which a rotor is movable relative to a stator in response to electric signals being applied to the stator.

Electromagnetic devices, such as electromagnetic indicators, etc., have been proposed in which a rotor is rotated relative to a stator by selectively actuating one or more of a plurality of electromagnets formed in the stator which cooperate with the magnetic poles of the rotor. However, a problem exists in situations where a signal is received to move the rotor precisely 180°, due to the fact that the signal from an electromagnet of the stator will be equally divided over each pole of the rotor. As a result, the turning couple will be equal in either direction, and no movement will occur.

This has been overcome according to prior arrangements by providing a shorting bar extending across the entire length of the rotor, which causes a biasing torque by virtue of the variable reluctance path it presents to the electromagnets of the stator. Another proposal provides a diagonally mounted shorting bar also extending the length of the rotor, and having its outer tips shaped to form a radius eccentric to the center of rotation of the rotor, so that a variable gap results between the stator and the shorting bar.

However, in both of these proposals the shorting bar shorts out some of the available magnetic flux through the rotor armature, and thereby considerably reduces the response time for the rotor for a given input voltage to the electromagnets.

SUMMARY OF THE INVENTION

It is therefore an object of the present invention to provide an electromagnet of the above type which permits a 180° movement of the rotor, with an improved response time.

Briefly summarized, the electromagnetic device of the present invention comprises a pole piece having a north pole member and a south pole member, electromagnetic means disposed in proximity to said pole piece and adapted to magnetically attract and repel said pole members to cause relative movement between said pole piece and said electromagnetic means, and at least one permeable bar disposed on each of said pole members, said bars being spaced apart and each being adapted to provide a variable reluctance path for magnetic flux passing between said pole piece and said electromagnetic means.

BRIEF DESCRIPTION OF THE DRAWINGS

Reference is now made to the accompanying drawings for a better understanding of the nature and objects of the present invention. The drawings illustrate the best mode presently contemplated for carrying out the objects of the invention and are not to be construed as restrictions or limitations on its scope. In the drawings.

DESCRIPTION OF THE PREFERRED EMBODIMENTS

Figure 1:
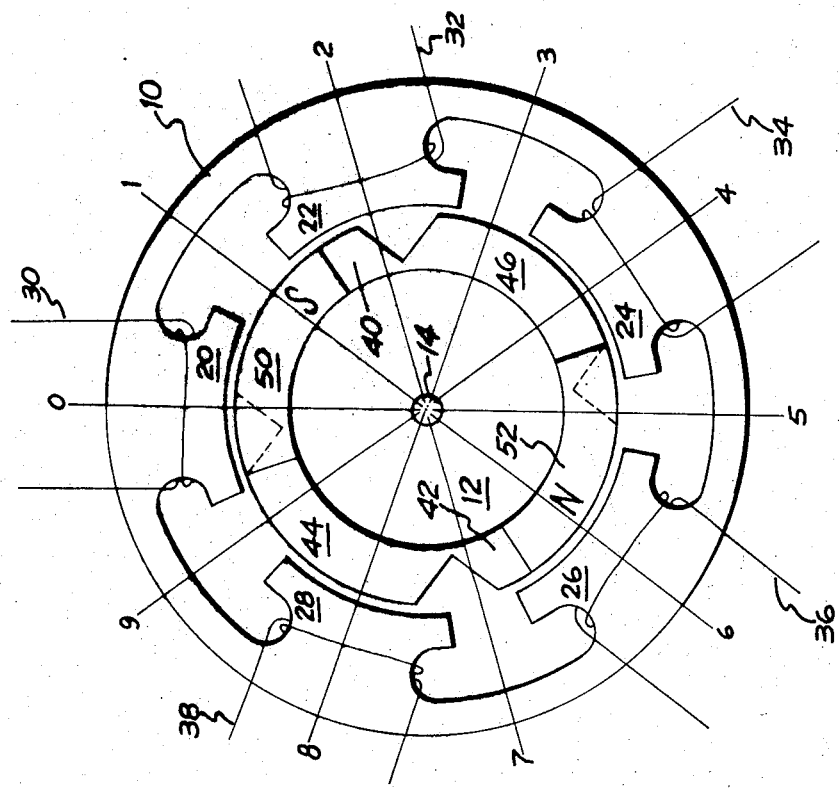
FIG. 1 is a front elevational view of the electromagnetic device of the present invention.
Figure 2:
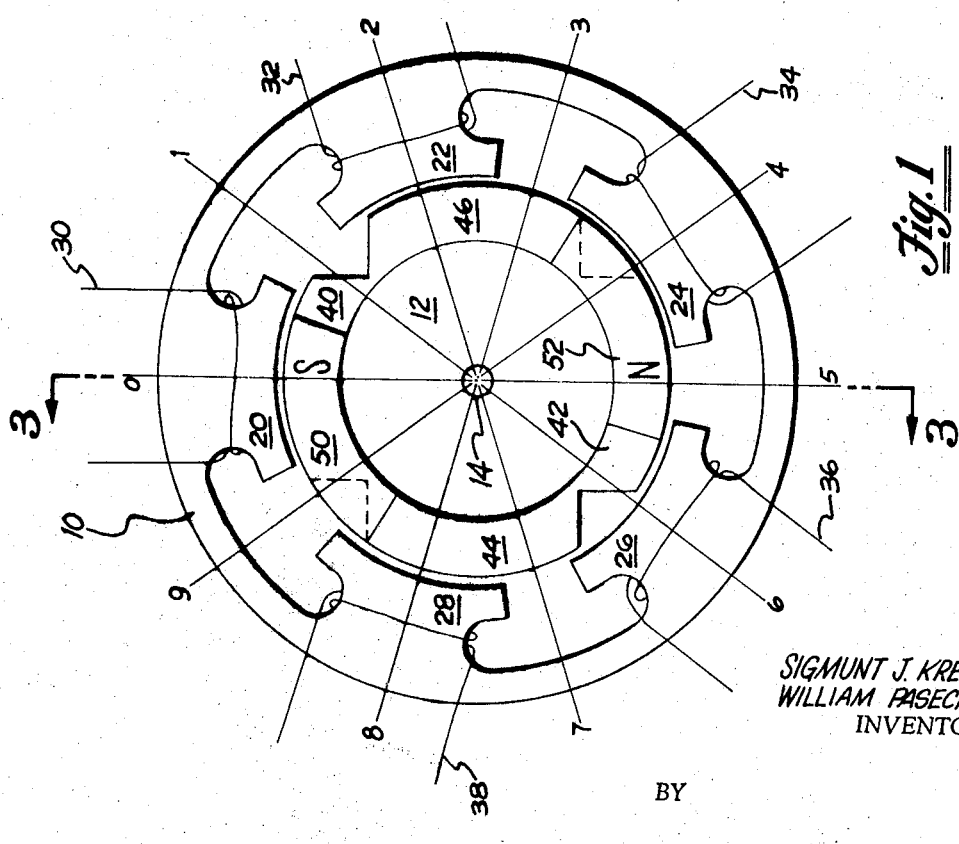
FIG. 2 is a view similar to FIG. 1 but showing the rotor in a different position.
Figure 3:
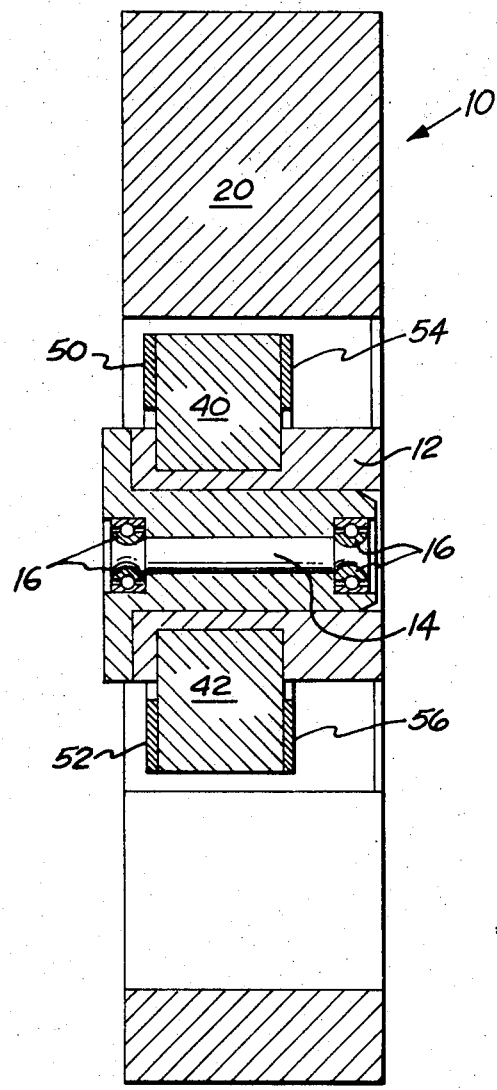
FIG. 3 is an enlarged vertical cross-sectional view taken along the line 3–3 of FIG. 1.

Referring to FIGS. 1—3 of the drawings, the electromagnetic device of the present invention comprises a fixed stator 10 which houses a rotor 12 mounted for rotation about a shaft 14 by a plurality of bearing members 16 (FIG. 3). It is understood that the shaft 14 and the stator 10 are supported by a common housing.

For the purpose of this application, it will be assumed that the device is in the form of an electromagnetic indicator in which the rotor 12 attains one of 10 angular positions with respect to the stator, each of which corresponds to one of the digits 0–9 as shown outlined in FIGS. 1 and 2. For this purpose, it is understood that additional structure such as a drum, pointer, scale, or the like (not shown), will be associated with the rotor 12.

The stator 10 has five teeth 20, 22, 24, 26 and 28 which extend radially inwardly towards the rotor, each of which has a coil 30, 32, 34, 36 and 38, respectively, wound therearound. The teeth are made of a permeable metal, or other similar material, so that when a current is applied to any coil from an external source, the particular tooth around which the coil is wrapped becomes an electromagnet and emits a magnetic flux, in a known manner.

The rotor 12 includes a notched disc portion of a magnetic material which is permanently magnetized to form a south pole member 40, a north pole member 42, and a pair of secondary pole members 44 and 46 which are separated by a neutral axis. The outer surfaces of these pole members are closely spaced to the outer surfaces of the teeth 20, 22, 24, 26 and 28.

A pair of arcuate bars 50 and 52 are disposed on the front portion of the pole members 40 and 42, respectively, while a second pair of arcuate bars 54 and 56 are disposed on the rear portions of the pole members 40 and 42, respectively, as viewed in FIG. 3. The bars are offset slightly with respect to the radial centerline of their respective pole members, and their purpose will be explained in detail later.

In normal operation, one or two of the coils 30, 32, 34, 36 and 38 is excited to magnetize its corresponding tooth or teeth and thus cause an interreaction between the latter and the pole members 40 and 42 of the rotor 12. For example, assuming that a signal is given to move the indicator from any previous position to a position corresponding to the indication 0, the coil 30 is excited in a manner to create an effective north pole at the tooth 20. The resulting magnetic flux will distribute itself around the stator in a known manner to establish a south polarity at the remaining stator teeth and thereby cause a resulting attraction and repulsion between the teeth and the pole members 40 and 42 of the rotor. As a result, the south pole member 40 will align itself in direct opposition to the magnetized north pole formed on tooth 20, as shown in FIG. 1. Since the indicator can be designed to give an indication corresponding to the position of the south pole member 40, the indication will thus be 0.

Assuming it is desired to move the indicator, and therefore the rotor 12, from any previous position to a position corresponding to the indication 1, the coils 30 and 32 will be excited, thereby electromagnetizing the teeth 20 and 22 and causing them to attain a north polarity while the remaining teeth thus attain a south polarity. This results in a mutual attraction and repulsion between the teeth and the pole members 40 and 42 as described above, to cause the south pole member 40 to move to a position wherein its radial centerline is directly between the teeth 20 and 22 as shown in FIG. 2, thus giving a indication of 1. It is noted that, once the power is cut off, this position is held by the lineup of the pole member 42 with the tooth 26.

It is thus apparent that the rotor 12 can be adapted to rotate to and from any of the 10 positions shown by simply exciting the coil or coils corresponding to the new desired position. Thus, coil 32 will be excited to magnetize tooth 22 and cause the rotor to attain a position corresponding to an indication of digit 2; coils 32 and 34 will be excited for position 3; coil 34 will be excited for position 4; coils 34 and 36 will be excited for position 5; and so on through the remaining positions.

As indicated above, a problem exists when it is desired to move the rotor precisely 180° away from its previous position. For example, assuming the rotor to be in a position corresponding to an indication of 1, as shown in FIG. 2, that is with the south pole member 40 aligned between the teeth 20 and 22 as shown, and assuming it is desired to move the rotor 180° to the position 6, it can be appreciated that upon the coil 36 being excited to magnetize the tooth 26, which would normally cause the rotor to move to this position, the resulting magnetic flux will be equally distributed across the north pole member 42 of the rotor. As a result, the turning couple will be equal in either direction and no torque will be developed. This is solved according to the present invention by the use of the arcuate bars 50, 52, 54 and 56 in order to present a variable reluctance path for magnetic flux passing between the tooth 26 and the north pole member 42 in order to cause a slight biasing rotation and move the rotor off of its "dead center" position. As a result, upon the tooth 26 being energized to a north polarity, the adjoining tooth 24 will attain a south polarity, and a slight attraction will exist between the latter and the north pole member 42 due to the fact that the arcuate bar provides an added flux path towards the tooth 24. This will cause a slight attraction between the tooth 24 and the north pole member 42 which will cause the rotor to move slightly in a counterclockwise direction as viewed in FIG. 2, and thereby leave the dead center position. After this is achieved, the rotor 12 will continue movement due to the normal attraction and repulsion between the teeth and the pole members, until the south pole member 40 attains a position directly opposite the tooth 26, or in the 6 position.

A further example will be described assuming that it is desired to move from the 0 position of FIG. 1 to the 5 position, also a distance of 180°. It is noted that, in the 0 position, the north pole member 42 is stationed between the two teeth 24 and 26 which are magnetized by exciting their respective coils 34 and 36 in a normal manner in order to effect movement to the 5 position. However, since the south pole member 40 is directly opposed to the tooth 20 and since the north pole member 42 is directly between the teeth 24 and 26, the turning couple will be equal in either direction and no torque will be developed. This is overcome by the presence of the bars 52 and 56 due to the fact that since the tooth 26 is not completely covered by these bars, the repulsive forces between it and the pole member 42 is greater than that between the latter and the tooth 24, due to the fact that the vector of repulsion between the tooth 26 and the pole member 42 passes further from the center of rotation than the vector of repulsion between the tooth 24 and the pole member 42, thus creating a resultant torque. This causes a slight counterclockwise movement of the rotor 12 until it clears the dead center position, after which it moves the remaining 180° by virtue of the normal attraction and repulsion between the pole members and the teeth, as described above.

In both of the above biasing operations, it is noted that the bars located 180° from the teeth that are energized have a minor effect because they are in an essentially equal-potential magnetic field under a south pole.

The arcuate bars utilized in the present invention thus achieve the above, while causing very little magnetic flux to short through the pole members 40 and 42 as in the case of the diagonally extending shorting bars utilized in the prior art. Therefore, the response time of the device of the present invention is changed very little from what it would be without the presence of the bars, and no additional voltage to the electromagnetics is required.

It can be appreciated that the location of the arcuate bars can be varied in accordance with specific requirements, and that the electromagnetic device of the present invention is not limited to use as an indicator, but has various other applications. Of course, other variations in the specific construction and arrangement of the electromagnetic device disclosed above can be made by those skilled in the art without departing from the invention as defined in the appended claims.

We claim:

1. An electromagnetic device comprising a pole piece in the form of a rotor and having an axis of rotation and having a north pole member and a south pole member disposed at diametrically opposite ends thereof, electromagnetic means in the form of a stator disposed in proximity to said pole piece and having at least five equispaced teeth having respective curved inner surfaces of substantially identical size and shape adapted to be selectively magnetized to magnetically attract and repel said pole members to cause relative angular movement between said pole piece and said electromagnetic means, and at least one arcuate-shaped permeable bar disposed on each of said pole members and being angularly offset from the radial axis of its pole member, said bar being long enough to overlap two adjacent teeth of said electromagnetic means, said bar having a curved outer surface coinciding with a curved outer surface of its respective pole member, said bar and its pole member having a combined outer surface of selective size and shape facing the inner surfaces of the two adjacent teeth of the electromagnetic means, said bars being spaced diametrically apart and each adapted to provide a variable reluctance path for magnetic flux passing between its pole member of said pole piece and the adjacent teeth of said electromagnetic means.

2. The device of claim 1 wherein there are two bars of substantially identical shape disposed on axially opposite sides of each of said pole members, and wherein said rotor includes a ring member of substantially constant thickness having four recesses on the radially outer edge thereof forming a cross-shaped rotor.